United States Patent [19]

Pacala et al.

[11] 4,316,827

[45] Feb. 23, 1982

[54] RUBBER MODIFIED PHENOLIC FRICTION PARTICLES

[75] Inventors: Luba A. Pacala; John R. Blickensderfer, both of Belle Mead, N.J.

[73] Assignee: Union Carbide Corporation, New York, N.Y.

[21] Appl. No.: 141,140

[22] Filed: Apr. 17, 1980

[51] Int. Cl.$^3$ .................... C08L 5/12; C08L 9/00; C08L 11/00; C08L 61/06
[52] U.S. Cl. .................... 260/17.2; 260/3; 260/14; 260/29.3; 260/29.6 NR; 260/29.7 NR; 525/139; 525/140; 525/141; 525/142; 525/143; 525/144
[58] Field of Search ............ 260/DIG. 39, 17.2, 3, 260/29.3, 29.6 NR, 29.7 NR; 525/139, 140, 141, 143, 144, 142

[56] References Cited

U.S. PATENT DOCUMENTS

| | | | |
|---|---|---|---|
| 3,730,920 | 5/1973 | D'Alessandro | 260/DIG. 39 |
| 3,864,304 | 2/1975 | Grazen et al. | 260/38 |
| 4,014,828 | 3/1977 | Thorpe | 260/38 |
| 4,014,850 | 3/1977 | Thorpe | 106/36 |
| 4,085,179 | 4/1978 | Hillhouse et al. | 260/29.7 NR |
| 4,098,770 | 7/1978 | Berchem et al. | 528/140 |
| 4,101,500 | 7/1978 | Brodsky | 260/DIG. 39 |

OTHER PUBLICATIONS

Martin, "The Chemistry of Phenolic Resins", John Wiley & Sons, Inc., New York, 1956, pp. 150-152.

*Primary Examiner*—Allan Lieberman
*Attorney, Agent, or Firm*—Francis M. Fazio

[57] ABSTRACT

Compositions useful as frictions particles comprised of tri- and/or tetrafunctional phenol, rubber, aldehyde, protective colloid and a reaction promoting compound. The friction particles are formulated into friction elements. A process for producing the friction particles in particulate form.

26 Claims, No Drawings

RUBBER MODIFIED PHENOLIC FRICTION PARTICLES

BACKGROUND OF THE INVENTION

Friction particles are compositions which find wide use in the formulation of friction elements. A friction element is a composition useful for imparting friction to a moving device without harming such device. Examples of friction elements are drum brake linings, disc brake pads, heavy-duty truck blocks and clutch plate facings. Generally about 5 to 15 weight percent of a friction element is composed of friction particles. A friction particle is a particulate material having the properties of no substantial softening, flowing together, or cohering at elevated temperatures. The friction particles are employed in the friction element for many reasons such as to reduce the frictional wear of the element, to smooth out the coefficient of friction values over wide temperature ranges and to provide a soft pedal action upon the application of the brake or similar device.

Friction particles have traditionally been prepared from cashew nutshell liquid (CNSL) which is a mixture of about 90 percent anacardic acid and 10 percent cardol. These friction particles have given very satisfactory results in friction element applications, but in recent years a number of disadvantages associated with their use have arisen. One major disadvantage is the rapidly increasing cost of the cashew oil. This is due to many facturs such as reduced and unreliable supply caused by bad weather conditions and political instability in the major exporting countries of the oil as well as the increasing costs associated with shipping the oil. Another problem is the highly dermatitic nature of the cardol component of the cashew oil; this is the cause of much disatisfaction among compounders of friction element formulations. A further disadvantage is the dusty nature of the friction particles due to the grinding process employed in their preparation; this dustiness is uncomfortable in itself and sometimes results in smoldering.

In response, there have been many efforts to synthesize a friction particle which will impart to a friction element the beneficial qualities of CNSL friction particles, but without the disadvantages of these friction particles. One such friction particle is disclosed in U.S. Pat. No. 3,864,304—this is a non-catalyzed product of the reaction at from about 225° F. to 400° F. of a non-hydroxy alkylated, hydroxy aromatic hydrocarbon-aldehyde resole containing substantially no etherified aromatic hydroxl groups with an alkylated hydroxy aromatic hydrocarbonaldehyde resole wherein the non-hydroxyalkylated resole comprises about 60 to 95 weight percent of the resin.

Because of the wide use of such friction particles in many devices commonly employed today, any new friction particle which can be synthetically produced and which will give comparable or improved performance over that obtained from conventional CNSL friction particles would be of great advantage.

SUMMARY OF THE INVENTION

It has now been found that resin compositions comprising (I) a mixture of phenols said mixture composed of from 25 to 100 mole percent of tri- and/or tetrafunctional phenols and from 0 to 75 mole percent of difunctional phenols, (II) from 1.1 to 3 moles per mole of phenol moiety of an aldehyde. (III) from 0 to 1 mole per mole of phenol moiety of a reaction promoting compound, (IV) from 0.05 to 6 weight percent based on the weight of components (I), (II), (III) and (V) of a protective colloid, and (V) from 1 to 40 weight percent based on the weight of component (I) of a rubber, all as hereinafter more fully defined, will give very beneficial results when used as friction particles; their performance generally equals or exceeds that of CNSL friction particles and their use reduces or avoids many of the disadvantages associated with CNSL friction particles.

DESCRIPTION OF THE INVENTION

In this application the functionality of the phenol refers to the number of unsubstituted ortho and para carbon atoms on the aromatic ring or rings.

The trifunctional phenols suitable for use in the compositions of this invention include phenol itself (monohydroxybenzene), and the meta substituted derivatives of phenol such as m- cresol, resorcinal, m-chlorophenol, 3,5-dimethylphenol, and the like.

The tetrafunctional phenols suitable for use in compositions of this invention include 2-2-(bis(4-hydroxyphenyl)-propane, 2,2-bis(4-hydroxyphenyl)ethane, 4,4'-dihydroxydiphenylsulphide, 4,4'-dihydroxydiphenylsulphone, 4,4'-dihydroxybiphenyl, and the like.

The difunctional phenols suitable for use in the compositions of this invention include p-cresol, p-chlorophenol, o-cresol, and alkyl substituted phenols wherein the alkyl group is saturated or unsaturated, substituted or unsubstituted, and contains from 1 to 18 carbon atoms such as p-nonylphenyl, p-t-butylphenol, p-styrenated phenol, and phenols substituted with ethylenically unsaturated hydrocarbons such as linseed type oils.

The rubbers suitable for use in the compositions of this invention are those which can form a latex and wherein latex is compatible with the other components of the compositions of this invention. By compatible it is meant that it will not cause destabilization or coagulation of the reaction mixture. As is known to those skilled in the art, certain surfactants, when introduced to a mixture of phenols, aldehyde, protective colloid and reaction promoting compound may result in destabilization of the reaction mixture. The rubber useful in the compositions of this invention must be one which can form a latex which will not destabilize the reaction mixture. Illustrative of the rubbers which can be used in the compositions of this invention one can name butadiene/acrylonitrile rubber, styrene/butadiene rubber, polychloroprene rubber, polyisoprene rubber, acrylics, carboxy-terminated butadiene/acrylonitrile rubber, carboxy-modified styrene/butadiene rubber, and the like.

The aldehydes useful in the compositions of this invention are those containing from 1 to 11 carbon atoms such as formaldehyde in any of its forms such as formalin or paraform, acetaldehyde, propionaldehyde, butyraldehyde, iosbutyraldehyde, furfuraldehyde, benzaldehyde, salicylaldehyde, crotonaldehyde, parahydroxybenzaldehyde, glyoxal, glutaraldehyde, naphthaldehyde, and the like.

A protective colloid as used in this application is a composition capable of promoting the production of, and/or of maintaining, a phenolic resin-in-water dispersion wherein the phenolic resin is the dispersed phase and the aqueous medium is the dispersing or continuous phase.

The protective colloids useful in the compositions of this invention include gum arabic, partially hydrolyzed polyvinylacetate modified and unmodified guar gums, gum ghatti, hydroxyethylcellulose, carboxymethylcellulose, soluble starch, agar and the like, and mixtures thereof. The preferred protective colloids are gum arabic and the modified guar gums.

The mixture of phenols is composed of from 25 to 100 mole percent, preferably from 55 to 100 mole percent, based on the total moles of phenolic monomers present, of tri- and/or tetrafunctional phenols; the balance of the phenolic monomers is composed of difunctional phenols.

The aldehyde is present in a concentration of from 1.1 to 3 moles, preferably from 1.1 to 2 moles, per mole of phenol moiety. A phenol moiety, as used in this application, is a hydroxysubstituted aromatic ring. Thus monohydroxybenzene has 1 phenol moiety, 2,2-bis(4-hydroxyphenyl)propane has 2 phenol moieties, etc.

The rubber is present in the compositions of this invention in a concentration of from 1 to 40 weight percent, preferably from 1 to 15 weight percent, based on the weight of the phenolic monomers present. As used herein the weight of the rubber for purposes of specifying concentration of the rubber refers to the dry weight of the rubber and not to the total weight of the rubber latex.

The protective colloid is employed in an amount sufficient to produce a resin-in-water dispersion. Generally this is from 0.05 to 6 weight percent, preferably from 0.1 to 5 weight percent, most preferably from 2 to 3 weight percent, based on the weight of total organic components.

The compositions of this invention can also contain optional ingredients such as wetting agents and other surfactants, fillers, extenders, pigments, dyestuffs, toughening agents, reinforcing agents and other additives known to those skilled in the art in the proportions normally employed, which proportions are also well known to those skilled in the art.

The compositions of this invention are produced by a two-step process. The first step involves the condensation reaction between the phenolic monomer or mixture of monomers and the rubber with the aldehyde. The second step involves the curing of the phenolic resin product of the first step.

The first step of the two-step process is promoted by a reaction promoting compound or catalyst. This compound can be of two types; it can be an alkali or alkaline earth hydroxide or oxide such as sodium hydroxide, potassium hydroxide, calcium hydroxide, barium hydroxide, calcium oxide and the like; or it can be an amine compound. The useful amine compounds include the primary, secondary and tertiary amines having up to 10 carbon atoms such as ammonia, hexamethylenetetramine, hydrazine, methylamine, ethylamine, dimethylamine, trimethylamine, ethylenediamine, aniline, cyclohexylamine, benzylamine, ethanolamine, and the like. Of course mixtures of the above reaction promoting compounds can be employed. The preferred reaction promoting compounds are ammonia or hexamethylenetetramime.

When the amine type compound is employed as the reaction promoting compound it can become incorporated into the product compositions.

The reaction promoting compound is present in the first-step or condensation reaction mixture in a concentration of from 0.01 to 1 mole, preferably from 0.01 to 0.2 mole, per mole of phenol moiety.

The condensation reaction mixture also contains water; the minimum amount of water necessary is that which is sufficient to produce a resin-in-water dispersion. The preferred amount of water will vary depending on the specific formulation but in general it will be from about 40 to 60 weight percent of the entire reaction mixture. There is no real maximum amount of water which can be employed but no particular advantage is generally obtained when a large excess of water is employed.

The reactants are employed in the condensation reaction mixture in proportion such that the resulting phenolic resin is of the thermosetting type. Generally this is achieved by keeping the ratio of reactive hydrogen equivalents on methylene to the reactive hydrogen equivalents on the aromatic rings at from 0.75 to 1.5, preferably from 1 to 1.5.

The condensation reaction is carried out by charging the aldehyde, the rubber, the phenols, the reaction promoting compound, the protective colloid, water, and other additives, if employed, to a reaction vessel; the reaction mixture is then heated under agitation to a temperature of from 50° C. to 100° C., preferably from 60° C. to 100° C., most preferably from 90° C. to 100° C. Of course the reaction temperature may be higher than 100° C. if the reaction is run at pressures above 1 atmosphere. Alternatively one or more of the reactants can be charged after the initiation of heat and/or agitation or one or more of the reactants can be continuously charged to the reaction for at least a portion of the reaction time. However, the aldehyde should not be initially reacted with the reaction promoting compound.

The above-described first step or condensation reaction can be of one of two types. One type results in the rubber being incorporated into the interior of the resin particle. In this type, the rubber is initially reacted with the other reactants to form the aqueous dispersion of the particulate, heat reactive and substantially water-insoluble phenolic resin. The other type results in the rubber being incorporated onto the surface of the resin particle. In this type, the reactants, except for the rubber, are initially reacted for a period of time and then the rubber is introduced to the reaction mixture; the reaction is then continued to form the aqueous dispersion of the particulate, heat reactive and substantially water-insoluble phenolic resin.

The area of incorporation of the rubber in the resin particle, i.e. whether it is incorporated onto the surface or into the interior of the resin particle may effect the performance of the particles when the particles are employed as friction particles, but it cannot be said that one is superior to the other. Whether rubber incorporation into the interior of the resin particles leads to superior performance over rubber incorporation on the exterior of the resin particles, or vice versa, will depend on the specific formulation used to prepare the compositions of this invention.

As use above and throughout this application the following are defined as:

Phenolic resin—a condensation product of a phenol and an aldehyde.

Aqueous dispersion—a mixture wherein the dispersing or continuous phase is composed primarily of water, although some organic material will be dissolved in the aqueous phase and some water will be contained in the dispersed resin phase.

Particulate phenolic resin—a finely divided organic phase having a maximum particle size of about 2 millimeters.

Heat reactive—a phenolic resin that is capable of polymerization at a usefully practical rate when subjected to elevated temperatures, such as above about 100° C., although such resins will advance slowly, but measurably, at lower temperatures.

Substantially water-insoluble—a phenolic resin that is capable of existing as a separate phase in an aqueous medium, though it may contain a finite proportion of watersoluble components.

The second step of the process for producing the compositions of this invention involves advancing the phenolic resin from the first step to a substantially completely reacted state. This is accomplished by the addition of an acidic compound such that the pH of the resin mixture is from about 0 to 4, preferably from 1 to 3. Suitable acidic compounds include acids such as sulfuric acid, hydrochloric acid, nitric acid, phosphoric acid, chloroacetic acid, toluenesulfonic acid, and the like, or any substance which releases a strong acid in water. After the pH has been adjusted the mixture is then heated up to 100° C. until the resin product has been substantially completely cured.

However, the addition of certain acids may cure the resin product without the need for application of external heat.

After this second step, the product is separated from the aqueous phase by any method effective in removing particulate material from a liquid phase; a convenient separation method is suction filtration. The product may then be washed with water and is dried. Use of a fluidized bed drier for this purpose has been found to be quite effective.

The product is thus recovered in particulate form and in the size range required for friction particles. Thus such costly, time consuming, and at times uncomfortable and possibly dangerous steps such as grinding and sieving, which have heretofore been necessary in the preparation of conventional friction particles, are avoided. Also this substantially reduces the possibility of incapacitating the reactor due to resin gelation which has been a problem in conventional bulk polymerization processes for preparation of phenolic resin. The particle size distribution of the compositions of this invention can be substantially controlled by the amount and/or type of protective colloid used and/or the level of agitation employed during the reaction. Generally the greater the amount of protective colloid employed and the greater the amount of agitation employed the smaller is the particle size of the product. Thus, practitioners of the art can produce friction particles of different sizes depending on the specific use to which they will be put.

The compositions of this invention can be used per se or be used as friction particles by incorporation into friction elements. Those skilled in the art are familiar with the conventional formulations and means of producing friction elements. Friction elements employing the novel friction particles of this invention may be comprised of from 30 to 70 weight percent of a high friction fibrous material, usually asbestos or a non-asbestos material such as metallic, glass or mineral fibers, or the like, up to about 40 weight percent of an inorganic filler material such as barium sulfate, litharge, hydrated alumina, cryolite, molybdenum disulfate, and others which are known to those skilled in the art, from 5 to 30 weight percent of friction binder and from about 1 to about 25 weight percent, preferably from about 5 to about 15 weight percent, of the friction particles of this invention. The friction element formulation can be molded at elevated temperature and pressure and baked to produce the finished friction element. Those skilled in the art are familiar with the procedures of producing friction elements.

It was completely unexpected and unobvious that the compositions of this invention would have such a beneficial effect when employed as friction particles in friction elements. Now, by employing the teachings of this invention, practitioners of the art can produce friction particles completely from synthetic materials and without the need for grinding and sieving thus avoiding or substantially reducing many of the problems associated with the heretofore available friction particles. The friction particles of this invention, when formulated into friction elements, give comparable or improved results over those obtained from friction elements employing conventional CNSL friction particles. These highly beneficial results could not have been predicted.

The following examples serve to further illustrate the invention.

EXAMPLE 1

There were charged to a one liter, 3-neck reaction flask equipped with a mechanical stirrer, thermometer and water-cooled reflux condenser, 200 grams (2.13 moles) of phenol, 191.5 grams of a 50 percent aqueous formaldehyde solution, (3.19 moles), 18 grams (0.13 mole) of hexamethylenetetramine, 206 grams of water, 2 grams of gum arabic and 10 grams of a 59/41 butadiene/acrylonitrile rubber latex having 41 percent solids. The reaction mixture was heated to reflux (100° C.) and kept there for 3 hours then cooled to about 80° C.; the pH was then adjusted to 1.9 by addition of 5 N sulfuric acid and the reaction mixture was heated at reflux for 2 hours. The substantially completely cured resin particles that formed were then isolated by suction filtration, washed with water and dried at 25° C. for 30 minutes and then at 60° C. for another 30 minutes in a fluidized bed dryer. This example illustrates the procedure wherein the rubber is incorporated into the interior of the phenolic resin particle.

EXAMPLE 2

There were charged to the reaction flask employed in Example 1, 200 grams (2.13 moles) of phenol, 145.6 grams of a 50 percent aqueous formaldehyde solution (2.42 moles), 18 grams (0.13 mole) of hexamethylenetetramine, 2 grams of partially hydrolyzed polyvinylacetate and 220 grams of water. The reaction mixture was refluxed at atmosphere pressure for 1 hour, cooled to 40° C. and there was added 20 grams of a 67/33 butadiene/acrylonitrile rubber latex having 50 percent solids. The reaction mixture was heated for 10 minutes and water was added to dilute the mass which had formed. The mixture was then refluxed for 1 hour, cooled to 50° and the pH adjusted to 2 by the addition of 5 N sulfuric acid. The reaction mixture was heated at reflux for one more hour and substantially completely cured particles were formed. The particles were isolated and dried as in Example 1. This example illustrates the procedure wherein the rubber is incorporated onto the exterior of the phenolic resin particle.

EXAMPLE 3

There were charged to the reaction flask employed in Example 1, 200 grams (2.13 moles) of phenol, 191.5 grams of a 50 percent aqueous formaldehyde solution (3.19 moles), 18 grams (0.13 mole) of hexamethylenetetramine, 2 grams of partially hydrolyzed polyvinylacetate, 206 grams of water, and 49 grams of a styrene/butadiene rubber latex having 40 percent solids and a transition glass temperature of $-30°$ C. The reaction mixture was refluxed for 1.5 hours, cooled to about 75° C. and the pH adjusted to 2 by the addition of 5 N sulfuric acid. The reaction mixture was heated at reflux for an additional hour and substantially completely cured particles were formed. The particles were isolated by suction filtration, washed with water, and dried at 60° C. for 30 minutes in a fluidized bed dryer.

EXAMPLE 4

There were charged to a 500 ml reaction flask equipped with a dropping funnel, mechanical stirrer, thermometer and water-cooled reflux condenser, 100 grams (1.06 moles) of phenol, 95.8 grams of a 50 percent aqueous formaldehyde solution (1.6 moles) 9 grams (0.06 mole) of hexamethylenetetramine, 0.35 gram of partially hydrolyzed polyvinylacetate, and 103 grams of water. The reaction mixture was heated at reflux for 1 hour, cooled to 40° C. and there was added 25 grams of the rubber latex used in Example 3 dropwise over a 5 minute period. There was then added 60 grams of water and the pH adjusted to 3.8 by the addition of a 10 percent solution of sulfuric acid. The mixture was then refluxed for 1 hour, cooled, and the substantially completed cured particles which had formed were allowed to settle. The supernatant liquid was decanted and the particulate matter was washed with water. The particles were isolated by suction filtration and dried for 30 minutes in a fluidized-bed dryer.

EXAMPLE 5

There were charged to the reaction flask employed in Example 4, 100 grams (1.06 moles) of phenol, 95.8 grams of a 50 percent aqueous formaldehyde solution (1.6 moles), 9 grams (0.06 mole) of hexamethylenetetramine, 0.35 gram of partially hydrolyzed polyvinylacetate and 103 grams of water. The mixture was refluxed for 1 hour, cooled to 50° C. and there was added 45 grams of a 25/75 styrene/butadiene rubber latex having 69 percent solids. The pH was adjusted to 4.7 by the addition of a solution of 5 grams of concentrated sulfuric acid and 3.3 grams of $AlK(SO_4)_2.H_2O$ in 100 ml of water. The reaction mixture was then heated at atmospheric reflux for 1 hour and cooled to 70° C. There then was added, dropwise, 15 grams of a 85/15 styrene/butadiene resin latex having 49 percent solids and refluxing was continued for 3 hours. The substantially completely cured particles which had formed were allowed to settle, the supernatent liquid was decanted, the particulate matter was washed with water, the particles were isolated by suction filtration and dried at 60° C. for 30 minutes in a fluidized-bed dryer.

EXAMPLE 6

Three friction particle compositions were produced using the procedure and reactants employed in Example 1 except that the type and/or amount of protective colloid was varied for each composition. The particles were sieved through four screens of increasing mesh and the percent retained on each screen along with that which passed through all screens into the pan is reported in Table I.

TABLE I

| | Protective Colloid* | | | | | |
| | Gum | Jaguar | Screen Mesh, Percent Retained | | | |
| Run | Arabic | Gum | 18 | 40 | 65 | 100 | PAN |
| --- | --- | --- | --- | --- | --- | --- | --- |
| 1 | 1 | 0 | 3 | 43 | 32 | 7 | 15 |
| 2 | 2 | 0 | 0 | 18 | 64 | 8 | 10 |
| 3 | 2.4 | 0.6 | 0 | 0 | 66 | 4 | 30 |

*parts, based on 100 parts of phenol

This example demonstrates that the amount of protective colloid employed effects the particle size distribution of the compositions. Generally, the greater is the concentration of protective colloid, the smaller is the particle size of the particulate product. This allows the maker of friction particles greater flexibility in manufacturing the friction particles of this invention to make friction particles of a specific size to suit his needs.

EXAMPLE 7

Three friction elements were produced by combining 60 weight percent of asbestos, 20 weight percent of a low molecular weight, unmodified novolak capable of sufficiently wetting the individual fibers in the asbestos bundles and typical of the organic friction binders used in the industry, 10 weight percent of barium sulfate as filler and 10 weight percent of one of three friction particle compositions of this invention, molding to 100 percent theoretical density at 375° F. under 2000 psi for 15 minutes, and baking for 8 hours at 450° F. The friction particle of Run 1 was produced by the procedure of Example 1 except that 20 parts of the latex used in Example 1 per 100 parts of phenol were used. The friction particle of Run 2 was produced by the procedure of Example 1 except that 10 parts of the latex of Example 2 per 100 parts of phenol were used. The friction particle of Run 3 was produced by the procedure of Example 2 except that 20 parts of the latex of Example 2 per 100 parts of phenol were used. For comparative purposes another friction element was produced using the same procedure as above but substituting for the friction particle of this invention a commercially available, widely used, CNSL-based friction particle having a similar particle size distribution to that of the above-described friction particles. The friction elements produced were one inch square and from about 0.24 to 0.29 inch thick.

The friction elements were evaluated as follows: the friction element was mounted on a standard Chase-type friction testing machine in such a manner as to bring it in contact with a rotating drum surface. With the drum rotating at a constant speed of 20 feet per second contact was effected for 10 seconds with a constant applied force of 150 psi; then the element was separated from the drum surface for 10 seconds; the cycle was performed 100 times. This 100 cycle procedure was performed at 400° F., 600° F., 800° F., and again at 400° F. The coefficient of friction was measured during each procedure when the rotating element was in contact with the rotating drum surface and the wear was determined after each procedure by measuring the weight loss for each friction element. After all four 100 cycle procedures were completed, the total percentage weight and thickness loss were determined for each friction element. The results are shown in Table II.

TABLE II

| Friction Element | Coefficient of Friction at °F. | | | Wear (in/hp-hr) × 10² at °F. | | | | Overall Wear (%) | | |
|---|---|---|---|---|---|---|---|---|---|---|
| | 400 | 600 | 800 | 400 | 400 | 600 | 800 | 400 | Thickness | Wt. |
| Run 1 | .30 | .35 | .46 | .23 | .5 | 6.1 | 10.3 | 3.9 | 39.8 | 41.4 |
| Run 2 | .28 | .39 | .45 | * | .5 | 7.6 | 12.3* | — | — | — |
| Run 3 | .29 | .34 | .44 | .13 | .5 | 6.4 | 18.4 | 3.5 | 57.8 | 57 |
| Control (CNSL) | .38 | .36 | .36 | .32 | .7 | 5.6 | 19.1 | 2.7 | 55 | 55.3 |

*incomplete test, 68 cycles

The results of this example clearly demonstrate that friction elements formulated with the butadiene/acrylonitrile-type novel friction particles of this invention exhibit comparable or significantly better wear than friction elements formulated with a commercially available CSNL based friction particle.

EXAMPLE 8

Three friction elements were produced using the procedure of Example 7 but substituting one of three friction particles produced by the procedures of Examples 3-5. The friction element of Run 1 was used a friction particle produced by the procedure of Example 3; that of Run 2 a friction particle produced as in Example 4; and that of Run 3 a friction particle produced as in Example 5. For comparative purposes a control friction element similar to that used in Example 7 was also produced. The friction elements were evaluated as in Example 7 and the results are reported in Table III.

TABLE III

| Friction Element | Coefficient of Friction at °F. | | | Wear (in/hp-hr) × 10² at °F. | | | | Overall Wear (%) | | |
|---|---|---|---|---|---|---|---|---|---|---|
| | 400 | 600 | 800 | 400 | 400 | 600 | 800 | 400 | Thickness | Wt. |
| Run 1 | .28 | .27 | .38 | .17 | .5 | 3.6 | 15.2 | 3.1 | 39.6 | 41.1 |
| Run 2 | .31 | .29 | .39 | .20 | .6 | 5 | 17.3 | 3.3 | 48.4 | 49.9 |
| Run 3 | .32 | .32 | .47 | .21 | .6 | 5.2 | 6.6 | 2.5 | 27.6 | 30 |
| Control (CSNL) | .38 | .36 | .36 | .32 | .7 | 5.6 | 19.1 | 2.7 | 55 | 55.3 |

The results of this example clearly demonstrate that friction elements formulated with the styrene/butadiene modified novel friction particles of this invention exhibit significantly better wear than friction elements formulated with the commercially available CSNL based friction particle.

What is claimed is:

1. A substantially completely cured particulate resin comprising:
   (I) a mixture of phenols said mixture comprised of from 25 to 100 mole percent of tri- and/or tetrafunctional phenols and from 0 to 75 mole percent of difunctional phenols;
   (II) from 1.1 to 3 moles per mole of phenol moiety of an aldehyde containing from 1 to 11 carbon atoms;
   (III) from 0 to 1 mole per mole of phenol moiety of a reaction promoting compound chosen from the group of the primary, secondary and tertiary amines having up to 10 carbon atoms;
   (IV) from 0.05 to 6 weight percent, based on the weight of components (I), (II), (III) and (V) of a protective colloid; and
   (V) from 1 to 40 weight percent, based on the weight of component (I) of a rubber which is capable of forming a latex wherein the latex is compatible with components (I)-(IV).

2. A particulate resin as claimed in claim 1 wherein said rubber (V) is present in a concentration of from 1 to 15 weight percent.

3. A particulate resin as claimed in claim 1 wherein said component (I) is monohydroxybenzene.

4. A particulate resin as claimed in claim 1 wherein said rubber (V) is butadiene/acrylonitrile rubber.

5. A particulate resin as claimed in claim 1 wherein said rubber (V) is styrene/butadiene rubber.

6. A particulate resin as claimed in claim 1 wherein said aldehyde (II) is present in a concentration of from 1.1 to 2 mole per mole of phenol moiety.

7. A particulate resin as claimed in claim 1 wherein said aldehyde (II) is formaldehyde.

8. A particulate resin as claimed in claim 1 wherein said reaction promoting compound (III) is present in a concentration of from 0.01 to 0.2 mole per mole of phenol moiety.

9. A particulate resin as claimed in claim 1 wherein said reaction promoting compound (III) is hexamethylenetetramine.

10. A particulate resin as claimed in claim 1 wherein said protective colloid (IV) is present in a concentration of 0.1 to 5 weight percent.

11. A particulate resin as claimed in claim 1 wherein said protective colloid (IV) is present in a concentration of from 2 to 3 weight percent.

12. A particulate resin as claimed in claim 1 wherein said protective colloid (IV) is gum arabic.

13. A particulate resin as claimed in claim wherein said protective colloid (IV) is partially hydrolyzed polyvinylacetate.

14. A particulate resin as claimed in claim 1 wherein said protective colloid (IV) is a mixture of gum arabic and guar gum.

15. A particulate resin as claimed in claim 1 wherein said component (I) is comprised entirely of tri- and/or tetrafunctional phenols.

16. The use of a substantially completely cured particulate resin comprising:
   (I) a mixture of phenols said mixture comprised of from 25 to 100 mole percent of tri- and/or tetrafunctional phenols and from 0 to 75 mole percent of difunctional phenols;

(II) from 1.1 to 3 moles per mole of phenol moiety of an aldehyde containing from 1 to 11 carbon atoms;

(III) from 0 to 1 mole per mole of phenol moiety of a reaction promoting compound chosen from the group of the primary, secondary and tertiary amines having up to 10 carbon atoms;

(IV) from 0.05 to 6 weight percent, based on the weight of components (I), (II), (III) and (V) of a protective colloid; and (V) from 1 to 40 weight percent, based on the weight of component (I) of a rubber which is capable of forming a latex wherein the latex is compatible with components (I)–(IV); as a friction particle in a friction element.

17. A friction element comprising about 30 to 70 weight percent of a high friction fibrous material, up to about 40 weight percent of an organic filler material, from about 5 to 30 weight percent of a friction binder, and about 1 to about 25 weight percent of a friction particle comprising:

(I) a mixture of phenols said mixture comprised of from 25 to 100 mole percent of tri- and/or tetrafunctional phenols and from 0 to 75 mole percent of difunctional phenols;

(II) from 1.1 to 3 mole percent of phenol moiety of an aldehyde containing from 1 to 11 carbon atoms;

(III) from 0 to 1 mole per mole of phenol moiety of a reaction promoting compound chosen from the group of the primary, secondary and tertiary amines having up to 10 carbon atoms;

(IV) from 0.05 to 6 weight percent, based on the weight of components (I), (II), (III) and (V) of a protective colloid; and (V) from 1 to 40 weight percent, based on the weight of component (I) of a rubber which is capable of forming a latex compatible with components (I)–(IV).

18. A friction element as claimed in claim 17 formulated with from 5 to 15 weight percent of said friction particle.

19. A process for the production of substantially complete cured resin particles comprising of steps of:

(A) reacting, in an aqueous medium, at from about 50° C. to about 100° C., (I) a mixture of phenols, said mixture comprised of from 25 to 100 mole percent of tri- and/or tetrafunctional phenols and from 0 to 75 mole percent of difunctional phenols, (II) from 1.1 to 3 moles per mole of phenol moiety of an aldehyde containing from 1 to 11 carbon atoms, (III) from 0.01 to 1 mole per mole of phenol moiety of a reaction promoting compound chosen from the group of alkali and alkaline earth hydroxides and oxides and the primary, secondary and tertiary amines having up to 10 carbon atoms, (IV) from 0.05 to 6 weight percent of a protective colloid based on the weight of components (I), (II), (III) and (V), and (V) from 1 to 40 weight percent, based on the weight of component (I) of a rubber which is capable of forming a latex wherein the latex is compatible with component (I)–(IV); for a period of time such that a particulate, heat reactive, and substantially water-insoluble phenolic resin is formed which is dispersed in said aqueous medium;

(B) adding an acidic compound to the aqueous dispersion of step (A) in an amount such that the pH of the aqueous dispersion is from 0 to 4;

(C) substantially completely curing the resin particles; and (D) separating the resin particles from the aqueous medium.

20. A process as claimed in claim 19 wherein in step (A) said component (V) is initially reacted with said components (I)–(IV).

21. A process as claimed in claim 19 wherein in step (A) said components (I)–(IV) are initially reacted and said component (V) is then reacted with said components (I)–(IV).

22. A process as claimed in claim 19 wherein the reaction temperature of step (A) is from 90° C. to 100° C.

23. A process as claimed in claim 19 wherein the reaction temperature of step (A) is the temperature of atmospheric reflux.

24. A process as claimed in claim 19 wherein in step (B) the acidic compound is added in an amount such that the pH of the aqueous dispersion is from 1 to 3.

25. A process as claimed in claim 19 wherein in step (B) the acidic compound is sulfuric acid.

26. A process as claimed in claim 19 wherein the curing step (C) is accomplished by the application of external heat.

* * * * *